United States Patent
Namiki et al.

(10) Patent No.: US 8,130,448 B2
(45) Date of Patent: Mar. 6, 2012

(54) OPTICAL PULSE MULTIPLEX UNIT

(75) Inventors: Mitsuru Namiki, Hanno (JP); Yuji Sakai, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 12/429,568

(22) Filed: Apr. 24, 2009

(65) Prior Publication Data

US 2010/0271707 A1 Oct. 28, 2010

(51) Int. Cl.
*G02B 27/14* (2006.01)

(52) U.S. Cl. ......................... 359/629; 359/636

(58) Field of Classification Search .............. 359/629, 359/636

See application file for complete search history.

(56) References Cited

U.S. PATENT DOCUMENTS

| 6,233,054 B1* | 5/2001 | Theriault ............... 356/451 |
| 2003/0189757 A1* | 10/2003 | Spiecker ............... 359/583 |
| 2007/0140695 A1* | 6/2007 | Suzuki et al. ............. 398/79 |

FOREIGN PATENT DOCUMENTS

| JP | 55-065919 A | 5/1980 |
| JP | 63-249827 A | 10/1980 |
| JP | 2002-267953 | 9/2002 |
| JP | 2002-333371 | 11/2002 |
| JP | 2003-270551 | 9/2003 |
| JP | 2004-279589 A | 10/2004 |
| JP | 2006-275908 A | 10/2006 |

OTHER PUBLICATIONS

Japanese Office Action dated May 25, 2011 of corresponding JP Application No. 2006-285999 together with an English translation.

* cited by examiner

*Primary Examiner* — Scott J Sugarman
*Assistant Examiner* — James Jones
(74) *Attorney, Agent, or Firm* — Scully, Scott, Murphy & Presser, P.C.

(57) ABSTRACT

A mirror unit consists of a half mirror and a mirror unit. The half mirror generates a transmitted light and a reflected light. A pair of the mirror units is arranged on one side and the other side of the half mirror so that the transmitted light and the reflected light split by the half mirror are deflected and are combined again at a common place on the half mirror. The mirror unit also has plural mirrors and is arranged to make the optical length variable by shifting the mirror unit toward one direction with a moving mechanism.

10 Claims, 16 Drawing Sheets

2$^N$ LIGHT PULSES

FIG. 4A  B1·O2
FIG. 4B  A1·O2
FIG. 4C  B2·O3
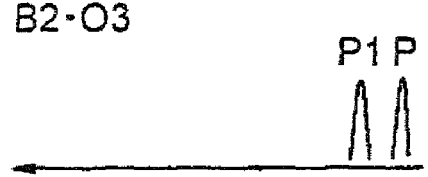
FIG. 4D  A2·O3
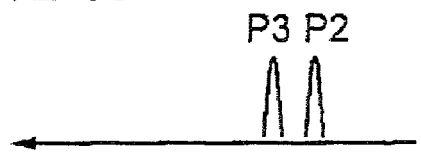
FIG. 4E  O3 JUST AFTER PASSAGE

FIG. 11A B1·O2
FIG. 11B A1·O2
FIG. 11C B2·O3
FIG. 11D A2·O3
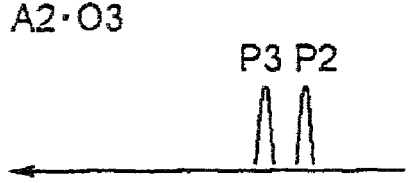
FIG. 11E O3 JUST AFTER PASSAGE
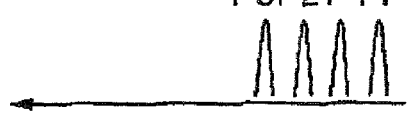

OPTICAL PULSE MULTIPLEX UNIT

BACKGROUND OF THE INVENTION

1. Field of the Invention

This invention relates to an optical pulse multiplex unit producing an optical pulse train.

2. Description of Related Art

A conventional optical pulse generator is set forth, for example, in US 2003/0012236A1. The function and structure of the optical pulse generator will be briefly explained with reference to FIG. 15. The optical pulse generator shown in FIG. 15 is constructed with a laser source 51, a delay structure 52, a condenser lens 53, and a wave-guide 54. The delay structure 52, as shown in FIG. 16, has a step-like contour. This can be thought of as an arrangement of a plurality of plane-parallel plates that are equal in refractive index but different in thickness. The plane-parallel plates are arranged at equal intervals in a direction perpendicular to the optical axis. The difference between thicknesses of adjacent plane-parallel plates, measured along the optical axis, is kept constant. When an optical pulse emitted from the laser source 51 is rendered incident as a plane wave on the delay structure 52, a change is caused to an optical path length in accordance with the thickness of the plane-parallel plate through which the optical pulse passes. Specifically, as indicated by numerals $55_1, 55_2, \ldots, 55_n$ in FIG. 16, a wavefront is stepwise modulated. Such light is collected by the condenser lens 53, and thereby an optical pulse train is transmitted to the wave-guide 54.

SUMMARY OF THE INVENTION

According to a first aspect of the present invention, an optical pulse multiplex unit has a half mirror for splitting incident light to produce transmitted light and reflect light, a pair of mirror units arranged on one side and the other side of the half mirror so that the transmitted light and the reflected light, split by the half mirror are deflected and are combined again at a common place on the half mirror, and the mirror units have a plurality of mirrors, it is desirable that each mirror unit is constructed with a moving mechanism which can be moved along the one direction so that the optical path length can be variable.

According to a preferable aspect of the present invention, it is desirable that there are (the) N (N is an integer) pairs of mirror units, and when the substantial optical path difference due to a shift of a first mirror unit toward one direction is denoted by $\Delta$, the substantial optical path difference due to an Nth mirror unit is $2^{N-1}\Delta$.

According to a preferable aspect of the present invention, it is desirable that mirror units can be moved parallel toward a normal direction of the half mirror.

According to a preferable aspect of the present invention, it is desirable that the mirror unit has two mirrors.

According to a preferable aspect of the present invention, it is desirable that the mirror unit has four mirrors.

According to a second aspect of the present invention, an optical pulse multiplex unit has a half mirror, a pair of mirror units arranged on one side and the other side of the half mirror, and a moving mechanism on one side of the half mirror; the mirror unit has at least two mirrors which are opposite to each other so that the distance between the two mirrors is decreased with distance from the half mirror; all the two mirrors and the half mirror are arranged orthogonally to a virtual plane; and one mirror unit of a pair of mirror units is fixed on the moving mechanism.

According to a third aspect of the present invention, an optical pulse multiplex unit has a half mirror for splitting incident light to produce transmitted light and reflect light, a pair of mirror units arranged on one side and the other side of the half mirror so that the transmitted light and the reflected light, split by the half mirror are deflected and are combined again at a common place on the half mirror, and the mirror units have a plurality of mirrors.

According to a preferable aspect of the present invention, N pair of the mirror units are arranged with a arbitrary intervals along to a normal direction of the half mirror, when the substantial optical path difference due to a first mirror unit is denoted by $\Delta$, the substantial optical path difference due to an Nth mirror unit is $2^{N-1}\Delta$.

According to a preferable aspect of the present invention, it is desirable that the mirror unit has two mirrors.

According to a forth aspect of the present invention, an optical pulse multiplex unit has a half mirror, a pair of mirror units arranged on one side and the other side of the half mirror, and a moving mechanism on one side of the half mirror; the mirror unit has at least two mirrors which are opposite to each other so that the distance between the two mirrors is decreased with distance from the half mirror; and the two mirrors and the half mirror are arranged to make a virtual plane which is orthogonal to both the two mirrors and the half mirror.

BRIEF DESCRIPTION OF THE DRAWINGS

FIGS. 4A, 4B, 4C, 4D and 4E are views of pulse train generated by the optical pulse multiplex unit of a first embodiment in the present invention;

FIGS. 11A, 11B, 11C, 11D and 11E are views of pulse train generated by the optical pulse multiplex unit of a third embodiment in the present invention;

DETAILED DESCRIPTION OF THE INVENTION

Embodiments of an optical pulse multiplex unit according the present invention will be described below in detail based on drawings. However, the present invention is not restricted by means of these embodiments.

Description of the First Embodiment

Figure 1:
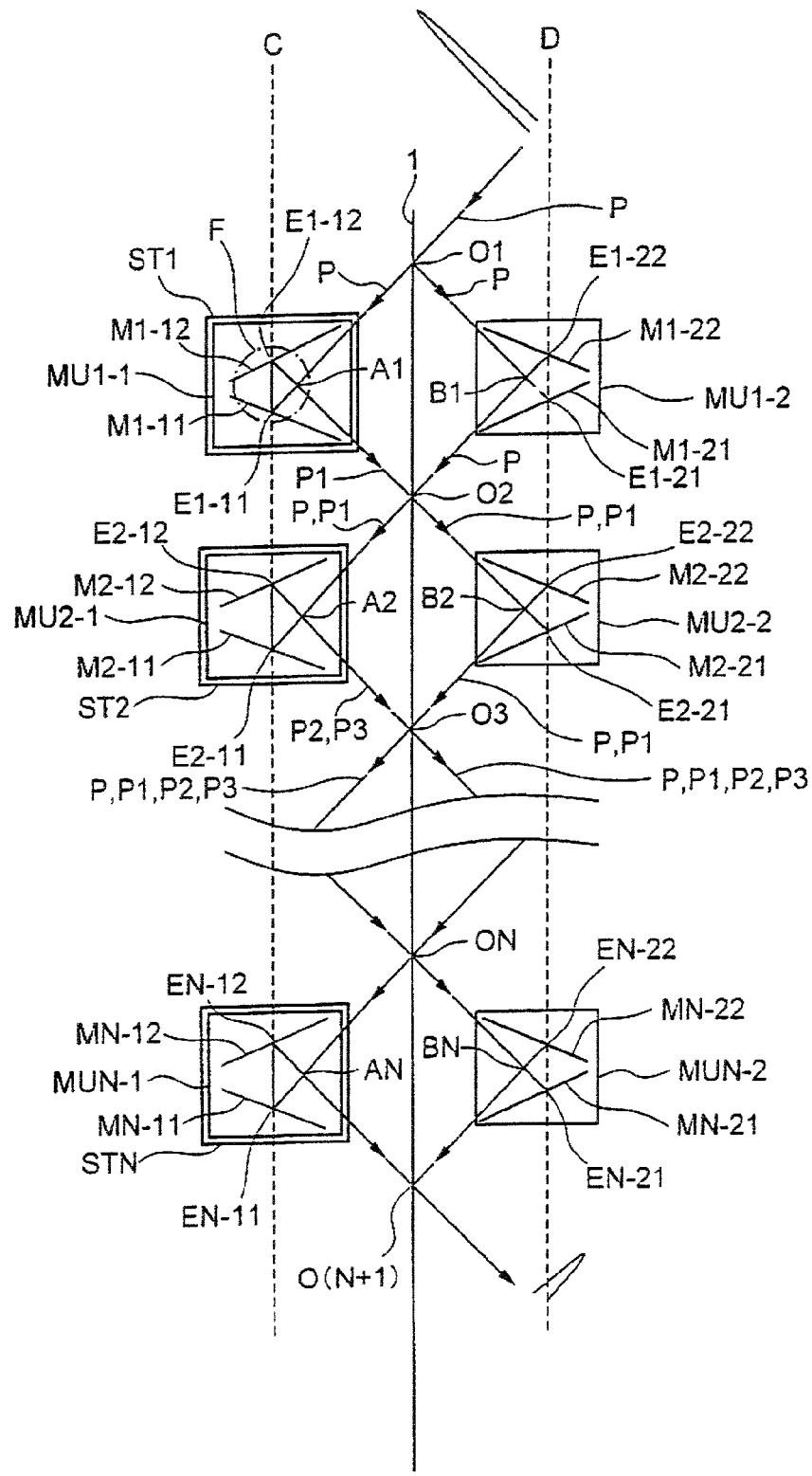
FIG. 1 is a view showing an operating condition of the optical pulse multiplex unit of a first embodiment.
Figure 2:
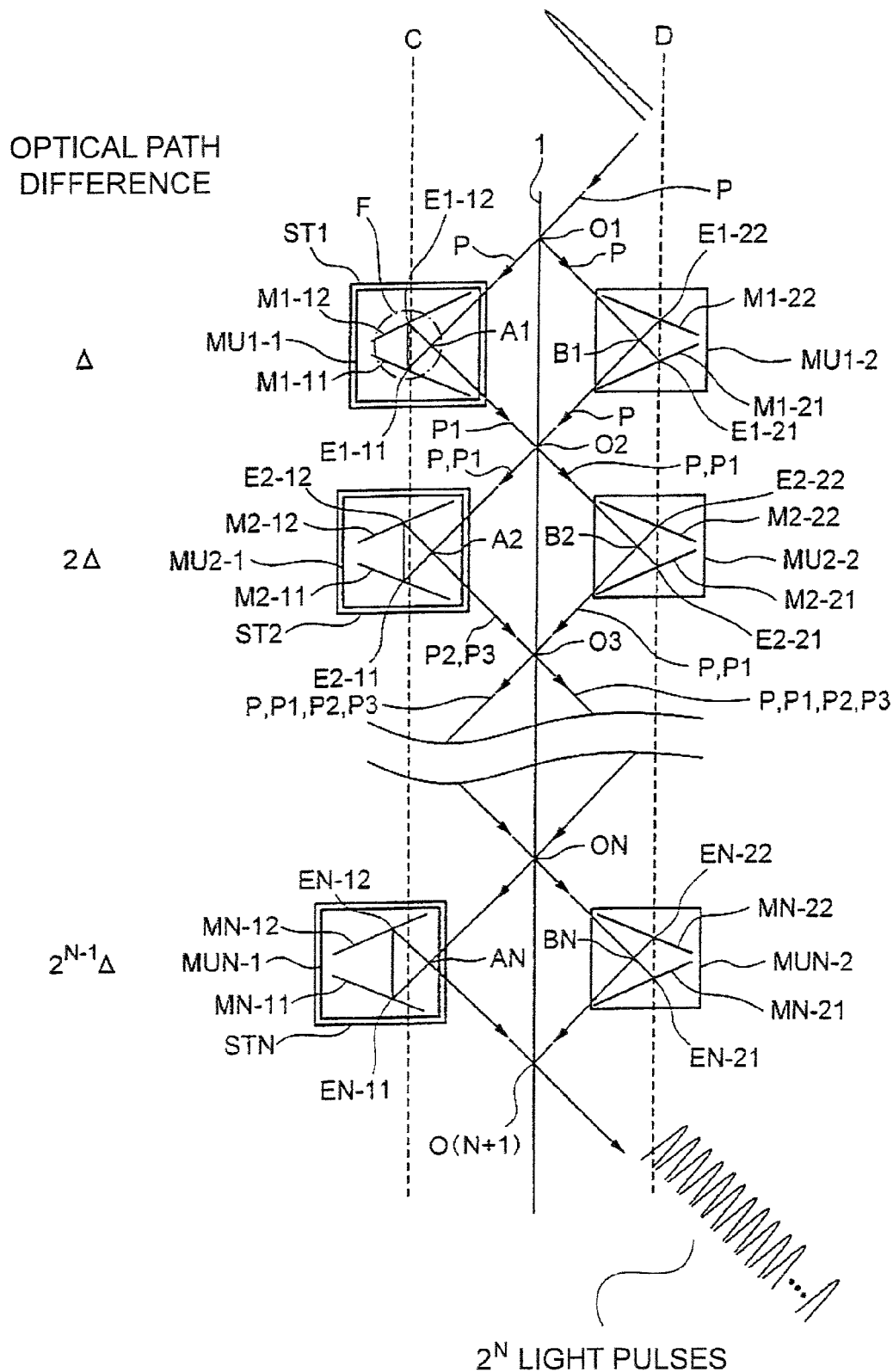
FIG. 2 is a view showing an operating condition of the optical pulse multiplex unit of a first embodiment.
Figure 3:
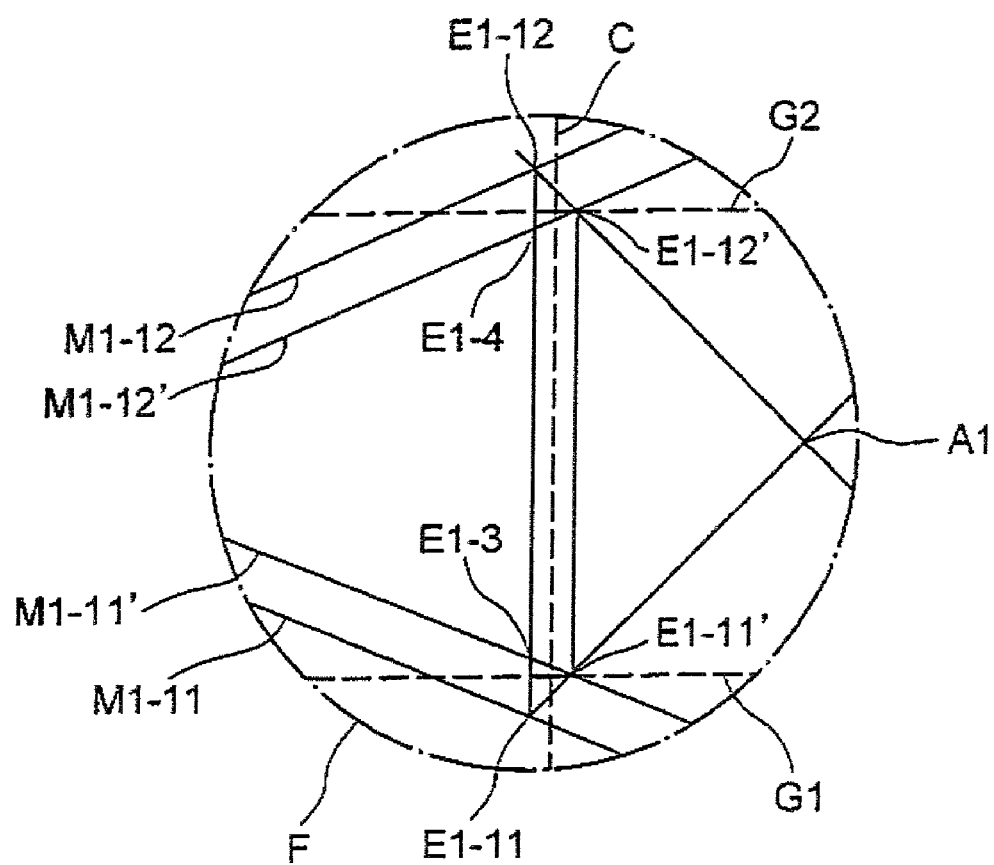
FIG. 3 is a magnified view showing a part of the optical pulse multiplex unit.

FIGS. 1, 2 and 3 are views of operating condition of the first embodiment of the optical pulse multiplex unit according to the present invention. Since the optical pulse multiplex unit has the same structure on every operating condition, the structure is explained with FIG. 1.

The optical pulse multiplex unit of the first embodiment is constructed with mirror units MUi-1(i=1~N), mirror units MUi-2(i=1~N), a half mirror 1, and moving mechanisms STi(i=1, 2, . . . , N). The mirror units MUi-1(i=1~N) include mirrors Mi-11(i=1~N) and mirrors Mi-12(i=1~N). The mirror units MUi-2(i=1~N) include mirrors Mi-21(i=1~N) and mirrors Mi-22(i=1~N). The moving mechanisms STi(i=1~N) are stages fixing the mirror units MUi-1(i=1, 2, . . . , N) on them.

The mirrors Mi-11(i=1~N) and the mirrors Mi-12(i=1~N) are arranged orthogonally to a virtual plane which is defined so that the mirrors Mi-11(i=1~N), the mirrors Mi-12 and the half mirror, all of them are orthogonal to the virtual plane. The mirrors Mi-21(i=1~N) and the mirrors Mi-22(i=1~N) are arranged in a similar manner.

The mirror units MUi-1(i=1~N) and mirror units MUi-2 (i=1~N) are arranged on one side and the other side of the half mirror 1 with opposite to each other. The half mirror 1 splits the optical pulse (amplitude) into a reflection-side pulse (amplitude) and a transmission-side pulse (amplitude) when the optical pulse (amplitude) rendered obliquely incident on the half mirror 1.

One of the optical pulses that have been split is reflected on the mirror Mi-11(i=1~N). The mirror Mi-11(i=1~N) are arranged so that the optical pulse reflected on the mirror Mi-11(i=1~N) propagates parallel to the reference line C. The optical pulse further reflected on the mirror Mi-11(i=1~N) is reflected on the mirror Mi-12(i=1~N).

The other of the optical pulses that have been split is reflected on the mirror Mi-21(i=1~N). The mirror Mi-21 (i=1~N) are arranged so that the optical pulse reflected on the mirror Mi-21(i=1~N) propagates parallel to the reference line D. The optical pulse reflected on the mirror Mi-21(i=1~N) is reflected on the mirror Mi-22(i=1~N).

One of the optical pulse reflected on the mirror Mi-12 (i=1~N) and the other on Mi-22(i=1~N) are combined at a common place on the half mirror 1. The optical pulse that has been combined is split again by the half mirror 1.

In this way, in the optical pulse multiplex unit of the first embodiment, the operation starting from the splitting of the optical pulse by the half mirror 1 and ending in the combining of the optical pulses on the half mirror 1 is repeated N times. The mirror units MUi-1(i=1~N), the mirror units MU-1 (i=1~N), the half mirror 1 have predetermined sizes so that the splitting and the combining can be performed a plurality of times.

The optical pulse multiplex unit constructed as mentioned above is arranged and used so that the mirror units MUi-1 (i=1~N), the mirror units MUi-2(i=1~N), and the half mirror 1 are inclined with respect to the incident optical path of the optical pulse. The reference line C and D are displaced at the position with the same distance. In other words, the reference lines C and D are arranged line-symmetrically with respect to the half mirror 1.

The intersection points Ai(i=1~N) and Bi(i=1~N) are the intersection points of the incident optical path and the exited optical path to the mirror units MU-1(i=1~N) and MUi-2 (i=1~N) and from them. The intersection points Ai(i=1~N) and Bi(i=1~N) are arranged symmetrically with respect to the half mirror 1.

FIG. 1 shows one condition of the optical pulse multiplex unit. In the condition shown in FIG. 1, the mirror units MUi-1(i=1~N), MUi-1(i=1~N), are just arranged symmetrically at the positions with respect to the half mirror 1. Then, the mirror units MUi-1(i=1~N) are arranged so that the optical pulse reflected on the mirror Mi-11 (i=1~N) propagates parallel to the reference line C. Similarly, the mirror units MUi-2(i=1~N) are arranged so that the optical pulse reflected on the mirror Mi-21 (i=1~N) propagates parallel to the reference line D. Consequently, when an optical pulse incoming to the optical pulse multiplex unit of the first embodiment in the condition shown on FIG. 1, only one optical pulse is generated.

Here, the mirror units MUi-1(i=1~N) are constructed so that the mirror units MUi-1(i=1~N) can be moved parallel to a normal direction of the half mirror 1. In other words, the mirror units MUi-1(i=1~N) can be moved along the line which is defined as the line joining the mirror units MUi-1 (i=1~N) and the mirror units MUi-2(i=1~N). The movement of the mirror units MUi-1(i=1~N) is carried on with the stages STi(i=1~N).

FIG. 2 shows the different condition of the optical pulse multiplex unit to FIG. 1. FIG. 2 shows the condition that the mirror units MUi-1(i=1~N) have been moved further from the half mirror 1. The function of these movements is explained with FIG. 3.

FIG. 3 shows the magnified view shown inside the dashed-dotted circle F in the FIG. 1. The mirror M1-11' and M1-12' show the mirror M1-11 and M1-12 in the FIG. 1. The mirror M1-11 and M1-12 show the mirror M1-11 and M1-12 in the FIG. 2. As shown in the FIG. 3, when the position of the mirror unit MU1-1 is changed, the positions of the mirror M1-11' and M1-12' are changed to the positions of the M1-11 and M1-12.

Here, the path from the point A to the C through B is defined as A•B•C. According to this rule, the path of the incident optical pulse to the mirror unit MU1-1 is changed with the movement of the mirror unit MU1-1, from A1•E1-11'•E1-12'•A1 to A1•E1-11•E1-12•A1.

Then, the optical path difference Δ with the movement of the mirror unit MU1-1 is equal to the sum of the optical path E1-11'•E1-11•E1-3 and E1-4•E1-12•E1-12'.

Similarly, the mirror units MU1-$j$($j$=2~N) are moved. Moving distance of the mirror units MU1-$j$($j$=2~N) are, however, different. When the optical path difference Δ with the mirror unit MU1-1 is as base difference, each mirror unit MUi-1(i=1~N) is moved so that each optical path difference is equal to $2^{i-1}\Delta$(i=1~N).

According to the condition of the optical pulse multiplex unit constructed in this way, the optical pulse P emitted from a pulse light source, not shown in the figure, enters a present place O1 on the half mirror 1. At this time, the optical pulse P is split into pulses on the transmission side and the reflection side of the half mirror 1. The optical pulse P reflected on the half mirror 1 passes through the route 1 (O1•B1•E1-21•E1-22•B1) and is incident on a preset place O2. Since the route 1 is base path, the optical pulse P is the P are as they are (FIG. 4A).

On the other hand, the optical pulse P transmitted through the half mirror 1 passes through the route 2 (O1•A1•E1-11•E1-12•A2). This route 2 has the optical path difference with Δ. Then the optical pulse P passing through the route 2 is changed into the optical pulse P1 to which the time delay is caused (FIG. 4B). The FIG. 4B is combined with FIG. 4A and FIG. 4B. This FIG. 4C shows the time delay between the optical pulses P and P1.

In this way, the optical pulses P split at the preset place O1 on the half mirror 1 are combined at the preset point O2 on the half mirror 1 through the route 1 and the route 2, respectively:

Route 1: O1•B1•E1-21•E1-22•B1
Route 2: O1•A1•E1-11•E1-12•A1

Next, the optical pulse P passing through the route 1 is split into a transmission-side and a reflection-side of the half mirror 1 at the preset place O2. Similarly, the optical pulse P1 passing through the route 2 is split into a transmission-side and a reflection-side of the half mirror 1.

Thus, the optical pulse P1 transmitted through the half mirror 1 of the optical pulse P1 traveling through the route 2 is combined with the optical pulse P reflected by the half mirror 1 of the optical pulse P traveling through the route 1 at the preset place O2.

And, the optical pulse P1 reflected on the half mirror 1 of the optical pulse P1 traveling through the route 2 is combined with the optical pulse P transmitted through the half mirror 1 of the optical pulse P traveling through the route 1 at the preset place O2. At the preset place O2, the splitting and the combining of the optical pulse are performed simultaneously.

Immediately after passing through the preset place O2, each of the split optical pulses (the transmission-side optical pulse and the reflection-side optical pulse) includes the optical pulses P and P1.

The optical pulses P and P1 traveling toward the mirror unit MU2-2 of split optical pulses pass through a route 3 (O2•B2•E2-21•E2-22•B2). Here, the mirror unit MU2-2 has the same structure of with the mirror units MU1-2. Then, the position of the mirror unit MU2-2 is coincided to that of the mirror unit MU1-2 when the mirror unit is moved along the reference line. Therefore, the time delay of the optical pulses traveling through the route 3 is not caused and same as the route 1. Then, the optical pulses P and P1 are as they are (FIG. 4C).

At the same time the optical pulses P and P1 traveling toward the mirror unit MU2-1 pass through the route 4 (O2•A2•E2-11•E2-12•A2). The mirror unit MU2-1 has the same structure with the mirror unit MU1-1. However, the position of the mirror unit MU2-1 is further from the half mirror 1 compared with the mirror unit MU1-1. That is, the mirror unit MU2-1 moves to the position where the optical path difference at the mirror unit $2\Delta$ is as twice as that $\Delta$ at the mirror unit MU1-1.

Thus, as shown in FIG. 4D, the optical pulse P changes into the optical pulse P2, while the optical pulse P1 changes into the optical pulse P3. The optical pulse P2 has a time delay corresponding to the optical path difference $2\Delta$ with respect to the optical pulse P. At the same time the optical pulse P3 has a time delay corresponding to the optical path difference $2\Delta$ with respect to the optical pulse P1. Here the optical pulse P1 already has a time delay corresponding to the optical path difference $\Delta$. Consequently, the optical pulse P3 has a time delay corresponding to the optical path difference $3\Delta$ with respect to the optical pulse P.

The optical pulses P and P1 are incident upon the preset place O3 on the half mirror 1. Specifically, the optical pulses which are split at the preset place O2 on the half mirror 1 intersect at the preset place O3 on the half mirror 1 through the following routes;

Route 3: O2•B2•E2-21•E2-22•B2
Route 4: O2•A2•E2-11•E2-12•A2

At the preset place O3, the light splitting is carried out as well as at the preset place O2. Thus, as shown in FIG. 4E, each of the split optical pulses includes the optical pulses P, P1, P2, and P3.

In the optical pulse multiplex unit of the first embodiment, as described above, the reflection and splitting-combination are alternately repeated with respect to the transmitted light generated when the optical pulse initially split, in the process that the light propagates an optical path: O1•A1-108 E1-11•E1-12•A1•O2•B2•E2-21•E2-22•B2•O3.

Similarly, the reflection, the splitting and the combination are alternatively repeated in the process that the light propagates an optical path O1•E31•E1-21•E1-22•B1•O2•A2•E2-11•E2-12•A2•O3 with respect to the reflected light generated when the optical pulse initially split.

Specifically, in the optical pulse multiplex unit of the first embodiment, for example, from the preset place O1 on the half mirror 1 to the preset place O3, there are four routes as listed below:

(1): O1•A1•E1-11•E1-12•A1•O2•A2•E2-11•E2-12•A2•O3
(2): O1•A1•E1-11•E1-12•A1•O2•B2•E2-21•E2-22•B2•O3
(3): O1•B1•E1-21•E1-22•B1•O2•A2•E2-11•E2-12•A2•O3
(4): O1•B1•E1-21•E1-22•B1•O2•B2•E2-21•E2-22•B2•O3

In the apparatus shown in FIG. 2 each optical pulses passing through the aforementioned four routes are combined simultaneously at the preset place O3 on the half mirror 1. At this time in the absence of the optical path differences $\Delta$ and $2\Delta$ produced at the mirror units MU1-1 and MU2-1 (the situation shown in FIG. 1), it can easily be understood that a combined optical pulse includes only the optical pulse P.

Then optical path difference in each route listed above varies as listed below. As a result, the optical pulse passing through each route has a time difference (time delay) upon reaching the preset place O3 on the half mirror 1•

(1) Route: O1•A1•E1-11•E1-12•A1•O2•A2•E2-11•E2-12•A2•O3
Optical path difference $3\Delta$
(2) Route: O1•A1•E1-11•E1-12•A1•O2•B2•E2-21•E2-22•B2•O3
Optical path difference $1\Delta$
(3) Route: O1•B1•E1-21•E1-22•B1•O2•A2•E2-11•E2-12•A2•O3
Optical path difference $2\Delta$
(4) Route: O1 •B1•E1-21•E1-22•B1•O2•B2•E2-21•E2-22•B2•O3
Optical path difference $0\Delta$ Consequently, the optical pulses passing through the four routes change into the optical pulse train that has a pulse interval of $\Delta/c$ where c is a light velocity. Therefore, in the route where the optical pulse reaches a preset place O(N+1) on the half mirror 1, subsequently the above routes, the optical pulse repeats the splitting and combination N times as well as the route described above. Thus, by moving the mirror units MUi-1 (i=1~N), as described above, the optical pulse trains P1, P2, P3, . . . , which have time delay with respect to the incident optical pulse P can be generated. The amount of this time delay is determined by the moving distance of the mirror units MUi-1 (i=1~N), that is, the optical path difference at the mirror units MUi-1 (i=1~N). Consequently, the mirror units MUi-1 (i=1~N) are so moved as to produce the optical pass difference of $\Delta'$ instead of that of $\Delta$ shown in FIG. 2.

Figure 5:
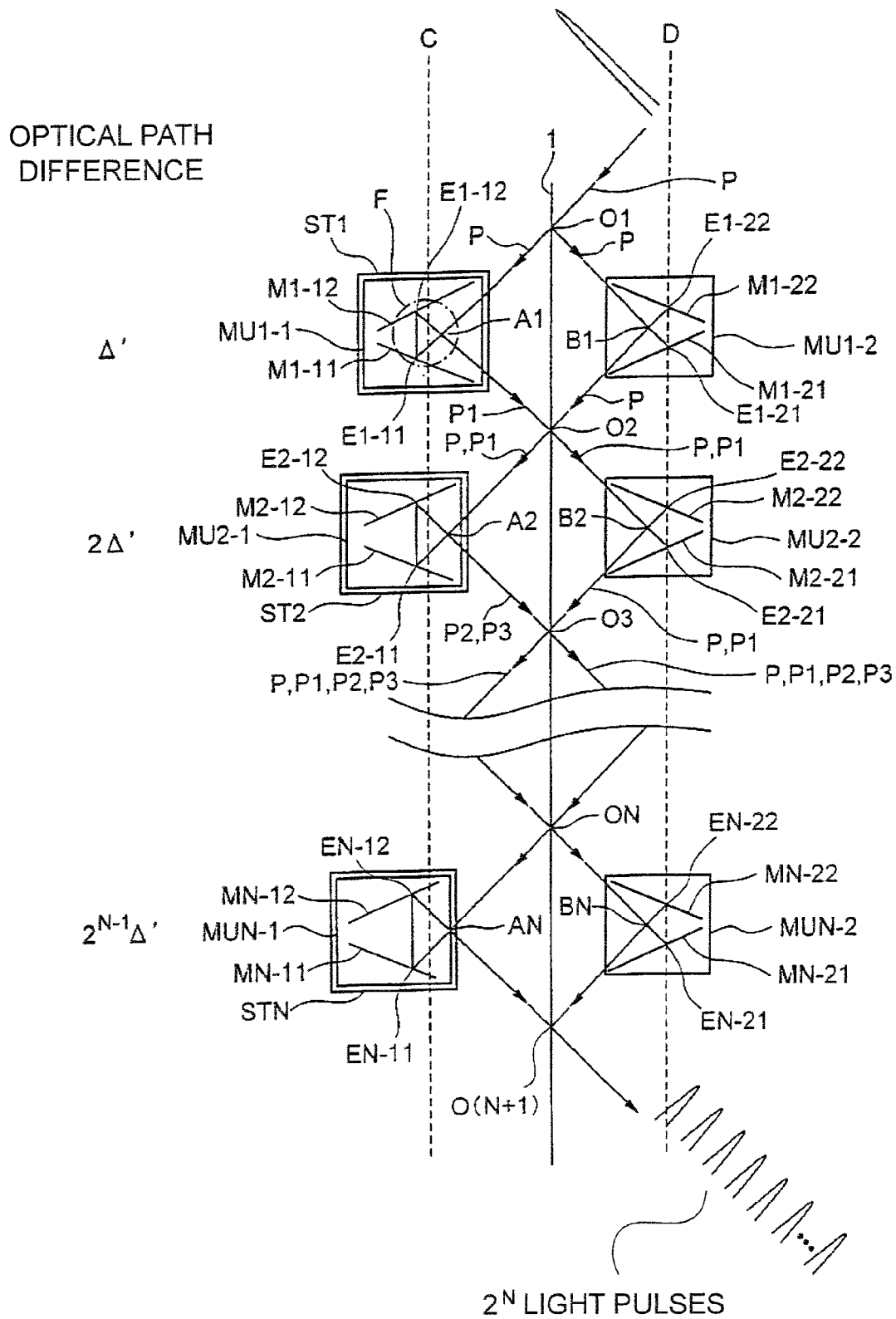
FIG. 5 is a view showing an operating condition of the optical pulse multiplex unit of a first embodiment.

FIG. 5 shows operating condition different from that in FIG. 2. As shown in FIG. 5, optical pulse train having a time interval different form that in FIG. 2 can be obtained.

Whereby, according to the optical pulse multiplex unit of the first embodiment, when a single optical pulse is incident upon the unit, it is possible to emit the optical pulse from the unit either as a single optical pulse or as $2^N$ pulse trains. Further time interval of the pulse trains is changeable.

Moreover, in the optical pulse produced in the optical pulse multiplex unit of the first embodiment, the optical pulses are not only spatially separated, but propagate completely along the same axis. Consequently, even though the optical pulse trains multiplexed through the optical pulse multiplex unit of the first embodiment are collected by means of the condenser lens, all optical pulses are collected at the same point from the same direction and thus, when a connection with a optical fiber is attempted, favorable connection efficiency can be realized.

Description of the Second Embodiment

Figure 6:
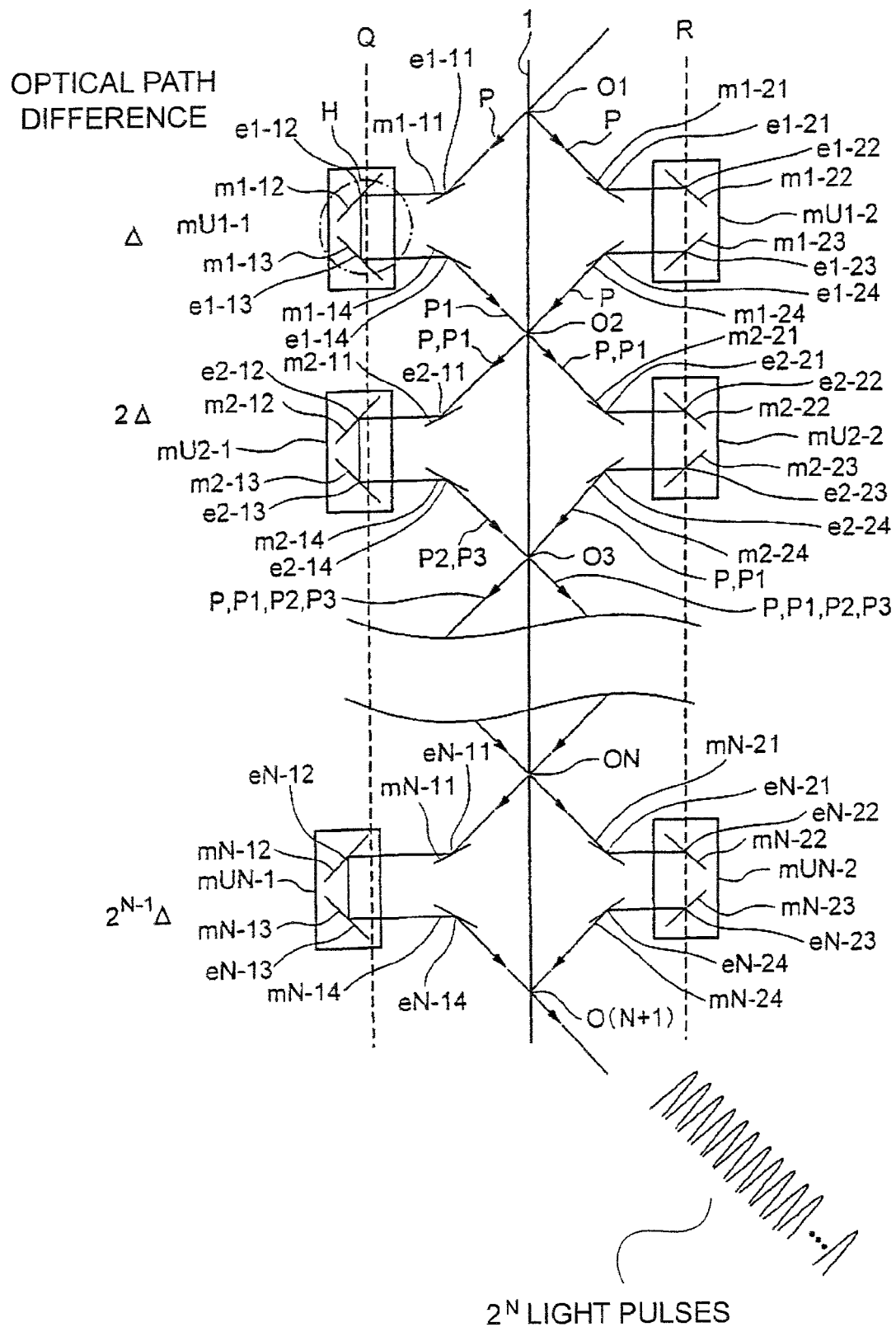
FIG. 6 is a view showing a schematic structures of the optical pulse multiplex unit of a second a second embodiment.
Figure 7:
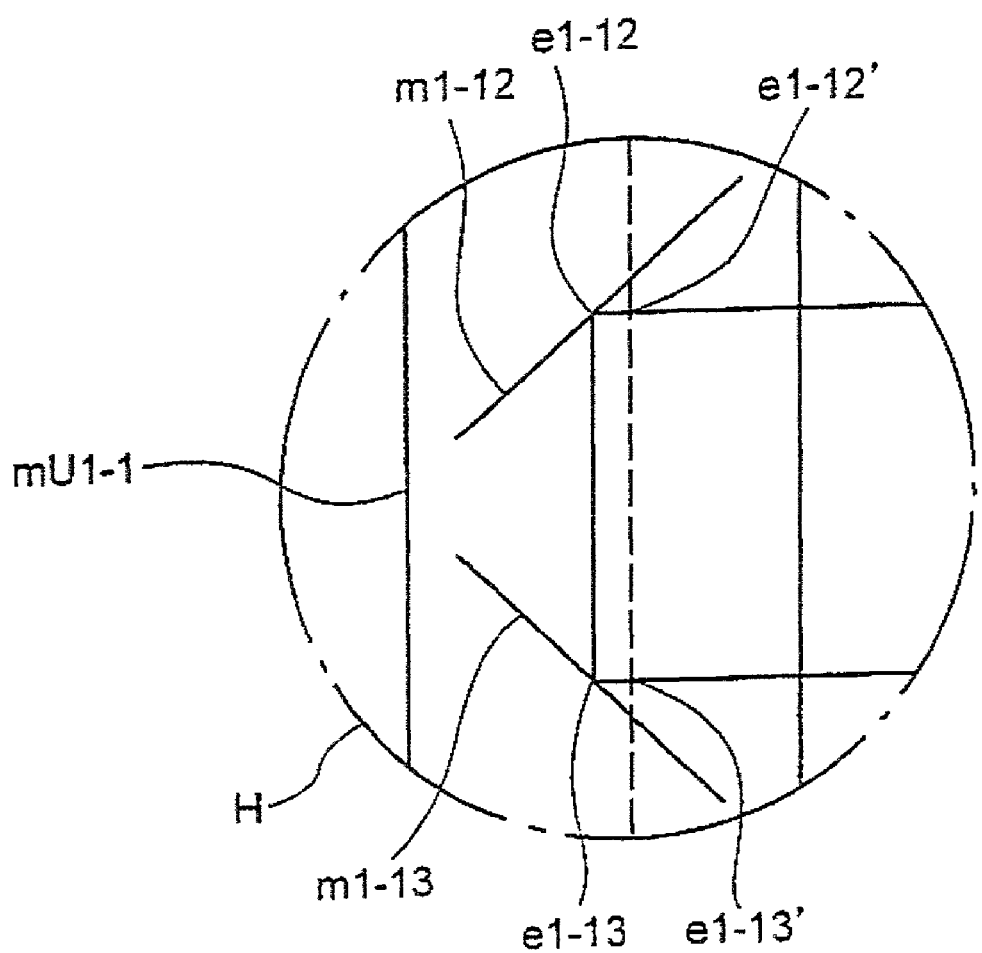
FIG. 7 is a magnified view showing a part of the optical pulse multiplex unit of a second embodiment.
Figure 8A:
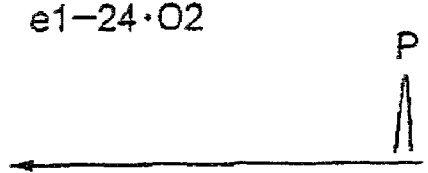
FIGS. 8A, 8B, 8C, 8D and 8E are views of pulse train generated by the optical pulse multiplex unit of a second embodiment in the present invention.
Figure 8B:
Figure 8C:
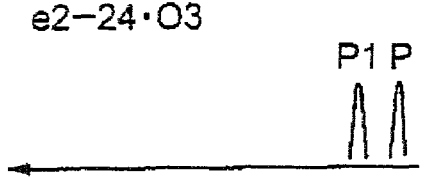
Figure 8D:
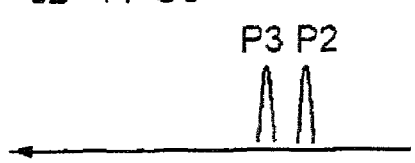
Figure 8E:

The optical pulse multiplex unit of the second embodiment of the present invention is described below. FIG. 6 shows schematic structure of the present embodiment. FIG. 7 shows a magnified view of the alignment framed by the dashed-dotted line H in FIG. 6.

The optical pulse multiplex unit in the first embodiment equips with the mirror units MUj-1 and MUj-2 (j=1~N). The mirror units MUj-1 (j=1~N) have mirrors Mi-11 (i=1~N) and Mi-12 (i=1~N), and the mirror units MUj-2 (j=1~N) have mirrors Mj-21 (i=1~N) and Mj-22 (i=1~N).

Whereas, in the optical pulse multiplex unit in the present embodiment, the mirror units mUj-1 (j=1~N) and mUj-2 (j=1~N) are used. The mirror unit mUj-1 (j=1~N) equips with two pair of mirrors. One pair has the mirrors mj-11 and mj-14 (j=1~N), and the other pair has the mirrors mj-12 (j=1~N) and mj-13 (j=1~N). The mirror unit mUj-2 (j=1~N) equips with two pair of mirrors. One pair has the mirrors mj-21 and mj-24 (j=1~N), and the other pair has mirrors mj-22 (j=1~N) and mj-23 (j=1~N).

The optical pulse multiplex unit is constructed so that optical path length can be changed by the movement of the mirror units mUj-1 (j=1~N) along with the line connecting the mirror units with the aforesaid mirror units at the opposite position.

The reference lines Q and R are located at the symmetric position with respect to the half mirror 1, and at the same time, they are parallel to the surface of the half mirror 1. In the absence of the movement of the mirror units mUj-1 (j=1~N), the reference lines Q and R are coaxial to the light ray propagating from the mirror mj-12 (j=1~N) to mj-13 (j=1~N) on the mirror units mUj-1 (j=1~N).

In the present embodiment, as shown in FIG. 7, when the mirror units mUj-1 (j=1~N) are moved the route along which the optical pulse P split by the half mirror 1 propagates is changed from the route: e1-11•e-12'•e-13'•e-14 into the route: e1-11 •e-12•e-13•e-14.

Consequently, the optical path difference of Δ that results from the movement of the mirror units mU1-1 corresponds to the summation of the length of the optical paths e1-12'•e-12 and e1-13'•e1-13.

Thus, by moving each mirror unit the optical path length of each route is changeable. Other structures, functions, and effects are the same as in the multiplex unit of the first embodiment.

According to the present invention, as explained above, the interval of the optical pulse trains can be set at arbitrary value by adjusting the moving distance of the mirror unit. At the same time, the optical pulse train which has a high coupling efficiency can be obtained.

This present invention is not limited to the above embodiments and can be variously modified without departing the spirit of the present invention. For example, in order to change the optical path length, the spacing of the mirrors can be changed.

Description of the Third Embodiment

Figure 9:
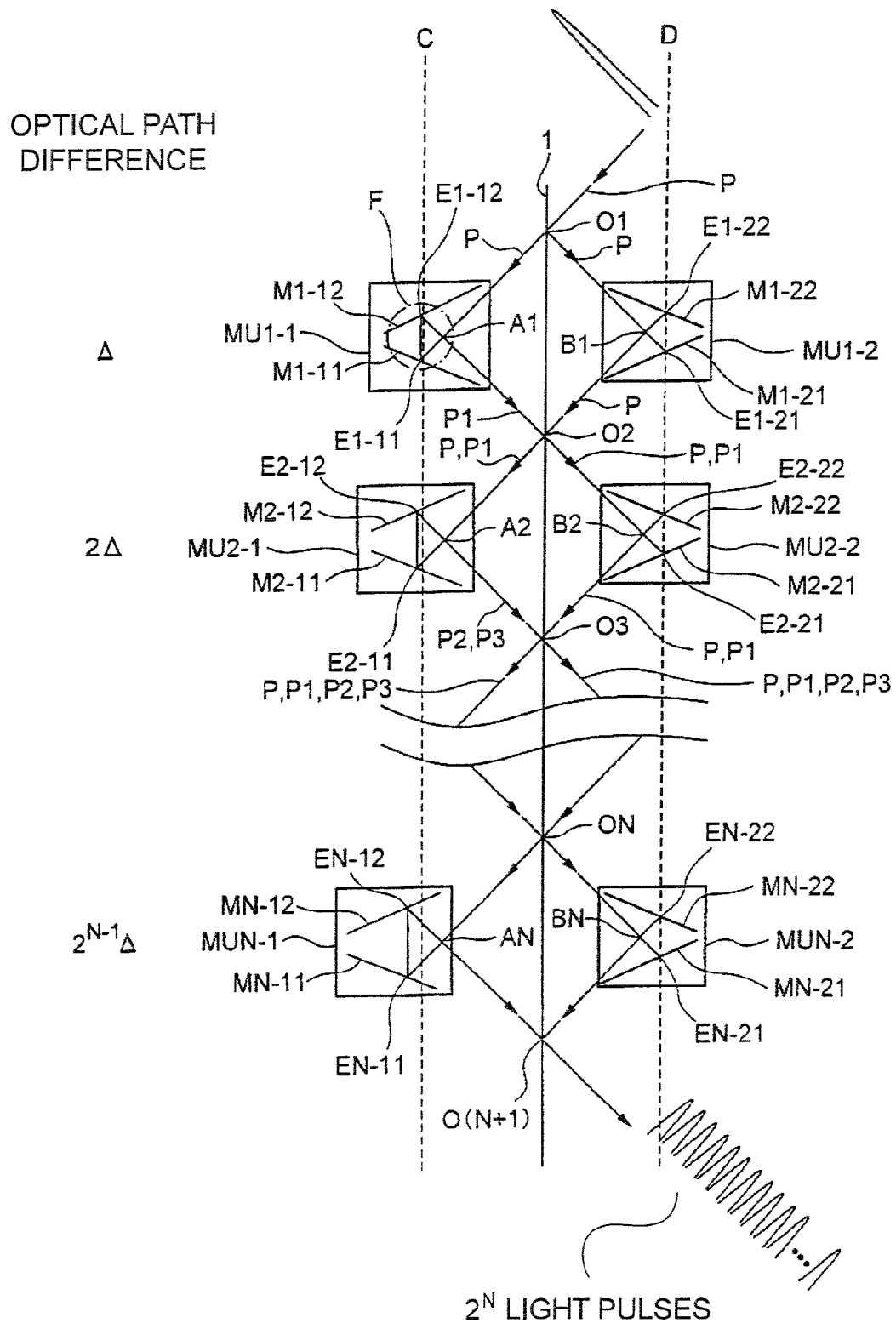
FIG. 9 is a view showing a schematic structure of the optical pulse multiplex unit of a third embodiment.

FIG. 9 shows the schematic structure of the optical pulse multiplex unit of the third embodiment of the present invention. The optical pulse multiplex unit in the present embodiment is composed of the mirror units MUi-1 (i=1~N), the mirror units MUi-2 (i=1~N), and the half mirror 1. The mirror unit MUi-1 equips with the mirrors Mi-11 (i=1~N) and Mi-12 (i=1~N), The mirror unit MUi-2 (i=1~N) equips with the mirrors Mi-21 (i=1~N) and Mi-22 (i=1~N).

The mirrors Mi-11 (i=1~N) and Mi-12 (i=1~N) are so set that the normal of the surface of the each mirrors are parallel to the normal of the surface of the half mirror 1. The mirrors Mi-21 (i=1~N) and Mi-22 (i=1~N) are also set in a similar fashion.

The mirror units MUi-1 (i=1~N) and the mirror units MUi-2 (i=1~N) are located at the opposite position with respect to the half mirror 1. The half mirror 1 splits the incident optical pulse into a reflection-side pulse and transmission-side pulse. The transmission-side optical pulse is reflected by the mirrors Mi-11 (i=1~N). The mirrors Mi-11 (i=1~N) are so adjusted that the reflected optical pulse travels parallel to the reference line C. The optical pulse reflected by the mirrors Mi-11 (i=1~N) is further reflected by the mirrors Mi-12 (i=1~N).

The reflection-side optical pulse is reflected by the mirrors Mi-21 (i=1~N). The mirrors Mi-21 (i=1~N) are adjusted so that the reflected optical pulse travels parallel to the reference line D. The optical pulse reflected by the mirrors Mi-21 (i=1~N) is further reflected by the mirrors Mi-22 (i=1~N).

Each optical pulses reflected by the mirrors Mi-12 (i=1~N) and Mi-22 (i=1~N) are combined again at the common place on the half mirror 1. The combined optical pulse is split again at the half mirror 1.

Thus, in the optical pulse multiplex unit of the third embodiment, the splitting of the optical pulse by the half mirror 1 and the combination of the optical pulses on the half mirror 1 are repeated N times. The mirror units MUi-1 (i=1~N), MUi-2 (i=1~N) and the half mirror 1 have predetermined sizes so that the splitting and combination can be performed a plurality of times.

The optical pulse multiplex unit thus constructed is arranged and used so that the mirror units MUi-1 (i=1~N), the mirror units MUi-2 (i=1~N) and the half mirror 1 are inclined with respect to the incident path of the optical pulse. At the same time the reference lines C and D are so located that the distance between each lines and the half mirror 1 is equal length. In other words, the reference lines C and D are located at the line symmetrical position with respect to the half mirror 1.

And the crossing points Ai (i=1~N) and Bi (i=1~N) are the points where the incident optical path toward the mirror unit MUi-1 (i=1~N) or MUi-2 (i=1~N) intersects the exiting optical path from the mirror units MUi-1 (i=1~N) or MUi-2 (i=1~N), respectively.

The crossing points of Ai (i=1~N) and Bi (i=1~N) are formed at the symmetric position with respect to the half mirror 1.

In FIG. 9, the mirror units MUi-2 (i=1~N) are set at the position where they have an equivalent distance from the half mirror 1. That is, the mirror units MUi-2 (i=1~N) are set so that the optical pulse reflected by the mirror units Mi-21 (i=1~N) propagates along with the reference line D.

Whereas the mirror units MUi-1 (i=1~N) are set at the N (N is integer) places with an arbitrary interval along with the normal direction to the reflection side of the half mirror 1.

In FIG. 9 the mirror units MUi-1 (i=1~N) are set at the position where they are apart from the base position mention later by predetermined amount toward the direction going away from the half mirror 1. The effect produced by this arrangement will be explained with an aid of FIG. 10.

Figure 10:
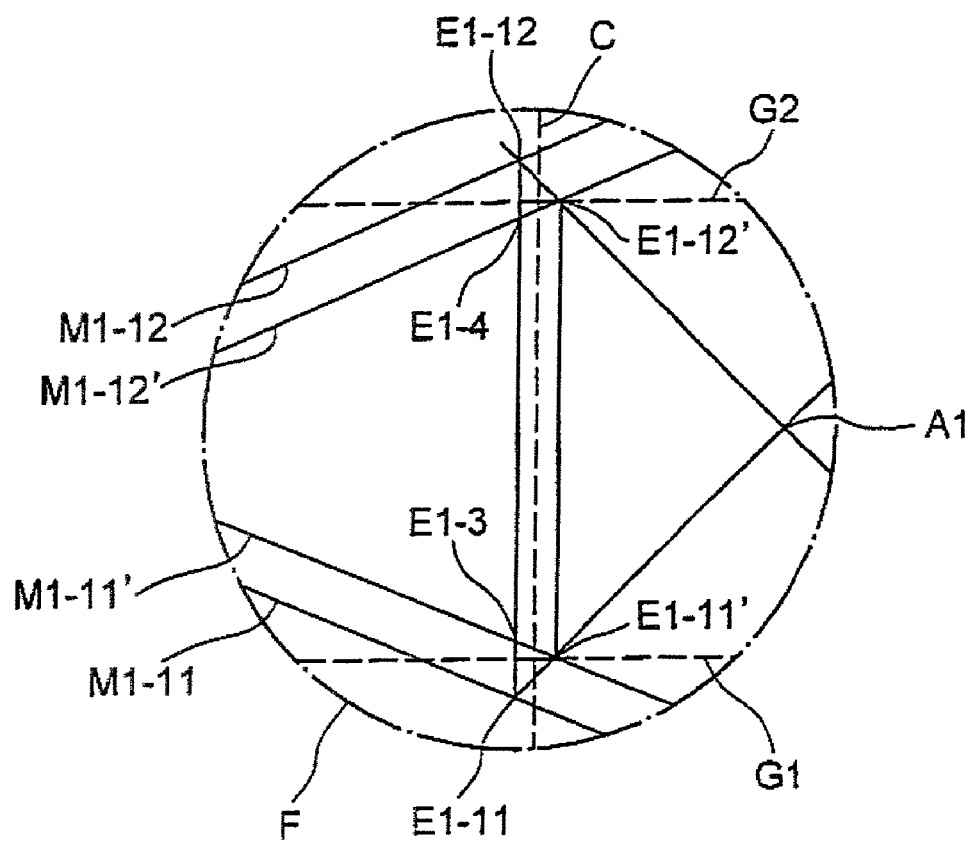
FIG. 10 is a magnified view showing a part of the optical pulse multiplex unit of the third embodiment.

FIG. 10 demonstrates an enlargement of the dashed-dotted line F shown in FIG. 9. At first, the "base position" in the mirror units MUi-1 (i=1~N) will be described below. The point where the light ray is reflected on the mirror M1-11' is named as E1-11'. The point where the light ray is reflected on the mirror M1-12' is named as E1-12'.

The "base position" is the position of the mirror units MUi-1 (i=1~N) where the line segment connecting the point E1-11' with the point E1-12' is superimposed to the reference line C. The G1 and G2 are lines passing through the points E1-11' and E1-11', respectively, and orthogonal to the reference line C.

In the apparatus described in FIG. 9, the mirror units MUi-1 (i=1~N) are set at the position different from the "base position" by the preset amount. The mirrors M1-11' and M1-12' in FIG. 10 show the mirrors M1-11 and M1-12 at the base position.

And the mirrors M1-11 and M1-12 demonstrated in FIG. 10 show the mirrors M1-11 and M1-12 in FIG. 9, respectively.

Here, for example, the routes (optical path) starting from the point A and ending at the point C through the point B is described as A•B•C. Then, based on this configuration, the route through which the incident optical pulse to the mirror unit MU1-1 travels changes from the route in the configuration of the base position: A1•E-11'•E-12'•A1, to the route in the configuration described in FIG. 9: A1•E1-11•E1-12•A1.

Due to this route change, the optical path difference $\Delta$ compared with that at the base position of the mirror unit MU1-1 corresponds to the summation of the length of the optical path E1-11'•E1-11•E1-3 and E1-4•E1-12•E1-12'.

Similarly, the mirror units MU1-i (i=2~N) are set to the position so that they are shifted from the base position by specified amount to the normal direction to the surface of the half mirror 1. The specified amount of the shifts from the base position are different in each mirror units, that is, on the basis of the optical path difference $\Delta$, each mirror units MUi-1 (i=1~N) is set to have the optical path difference of $2^{i-1}\Delta$ (i=1~N).

In this apparatus described as above, the optical pulse P emitted from the non-described pulsed light source is incident upon the preset place O1 on the half mirror 1. Due to the half mirror 1 the optical pulse P is split into a reflection-side pulse and a transmission-side pulse with respect to the half mirror 1. The optical pulse P reflected at the half mirror 1 passes through the route 1: O1•B1•E1-21•E1-22•B1, and then is incident upon the preset place O2. As this route is basic route the optical pulse P coincides with the incident optical pulse itself. FIG. 11A demonstrates this circumstance.

On the other hand, the optical pulse P transmitting the half mirror 1 passes through the route 2: O1•A1•E1-21•E1-22•A1. This route 2 includes the optical path difference $\tilde{\Delta}$. Consequently, by the propagation of the optical pulse through the route 2, the optical pulse P1 having the time delay corresponding to the optical path difference $\Delta$ is generated. This situation is shown in FIG. 11B. The FIG. 11A and FIG. 11B are superimposed at the FIG. 11C. According to FIG. 11C, it is understood that the time difference (time delay) is generated between the optical pulse P and the optical pulse P1.

Thus each of the optical pulse P which is split at the preset place O1 on the half mirror 1 intersects at the preset place O2 on the half mirror 1 by way of the following routes:

Route 1: O1•B1•E1-21•E1-22•B1
Route 2: O1•A1•E1-11•E1-12•A1

Then, at the preset place O2 the optical pulse P passing through the route 1 is split into a reflection-side pulse and a transmission-side pulse with respect to the half mirror 1. Similarly, the optical pulse P1 passing through the route 2 is split into a reflection-side pulse and a transmission-side pulse with respect to the half mirror 1.

Consequently, the optical pulse P1 passing through the route 2 and transmitting the half mirror 1 is combined to the optical pulse P passing through the route 1 and reflected at the half mirror 1 at the preset place O2.

At the same time the optical pulse P1 passing through the route 2 and reflected at the half mirror 1 is combined to the optical pulse P passing through the route 1 and transmitting the half mirror 1 at the preset place O2. In this way the splitting and combination of the optical pulse are carried out simultaneously at the preset place O2. Both split optical pulses (the optical pulse at the reflection-side and the transmission-side) contain the optical pulses P and P1 immediately after they pass through the preset place O2.

The optical pulses P and P1 traveling toward the mirror unit MU2-2 of split optical pulses pass through the route 3 (O2•B2•E2-21•E2-22•B2). The mirror unit MU2-2 has the same structure with the mirror unit MU1-2. The position of the mirror unit MU2-2 is coincided to that of the mirror unit MU1-2 when the mirror unit is moved along the reference line D. Therefore, the time delay of the optical pulses traveling through the route 3 is not caused and the same as the route 1. Then, the optical pulses P and P1 reaching at the preset place O3 are as they are (FIG. 11C).

At the same time, the optical pulses P and P1 traveling toward the mirror unit MU2-1 pass through the route 4 (O2•A2•E2-11•E2-12•A2). The mirror unit MU2-1 has the same structure with the mirror unit MU1-1. However the position of the mirror unit MU2-1 is away from the half mirror 1 compared with that of the mirror unit MU1-1. That is, the mirror unit MU2-1 moves to the position where the optical path difference at the mirror unit $2\Delta$ is as twice as that $\Delta$ at the mirror unit MU1-1.

Thus, as shown in FIG. 11D, the optical pulse P changes into the optical pulse P2, while the optical pulse P1 changes into the optical pulse P3. The optical pulse P2 has a time delay corresponding to the optical path difference $2\Delta$ with respect to the optical pulse P. At the same time the optical pulse P3 has a time delay corresponding to the optical path difference $2\Delta$ with respect to the optical pulse P1. Here the optical pulse P1 already has a time delay corresponding to the optical path difference $\Delta$. Consequently, the optical pulse P3 has a time delay corresponding to the optical path difference $3\Delta$ with respect to the optical pulse P.

The optical pulses P and P1 are incident upon the preset place O3 on the half mirror 1. Specifically, the optical pulses which are split at the preset place O2 on the half mirror 1 intersect at the preset place O3 on the half mirror 1 through the following routes:

Route 3: O2•B2•E2-21•E2-22•B2
Route 4: O2•A2•E2-11•E2-12•A2

At the preset place O3, the light splitting is carried out as well as at the preset place O2. Thus, as shown in FIG. 11E, each of the split optical pulses includes the optical pulses P, P1, P2, and P3.

In the optical pulse multiplex unit of the first embodiment, as described above, the reflection, the splitting, and the combining are alternately repeated with respect to the transmitted light generated when the optical pulse initially split, in the process that the light propagates an optical path: O1•A1•E1-11•E1-12•A1•O2•B2•E2-21•E2-22•B2•O3

Similarly, the reflection, the splitting, and the combining are alternatively repeated with respect to the reflected light generated when the optical pulse initially split, in an optical path: O1•B1•E1-21•E1-22•B1•O2•A2•E2-11•E2-12•A2•O3

Specifically, in the optical pulse multiplexing unit of the third embodiment, for example, from the preset place O1 on the half mirror 1 to the preset place O3, there are four routes as listed below:
(1): O1~A1•E1-11•E1-12•A1•O2•A2•E2-11•E2-12•A2•O3
(2): O1•A1•E1-11•E1-12•A1•O2•B2•E2-21•E2-22•B2•O3
(3): O1•B1•E1-21•E1-22•B1•O2•A2•E2-11•E2-12•A2•O3
(4): O1•B1•E1-21•E1-22•131•O2•B2•E2-21•E2-22•B2•O3

In the apparatus shown in FIG. 9 each optical pulses passing through the aforementioned four routes are combined simultaneously at the preset place O3 on the half mirror 1. At this time in the absence of the optical path differences $\Delta$ and $2\Delta$ produced at the mirror units MU1-1 and MU2-1 (the situation of at the base position), it can easily be understood that a combined optical pulse includes only the optical pulse P.

Then optical path difference in the each route listed above varies as listed below. As a result, the optical pulse passing through the each route has a time difference (time delay) upon reaching the preset place O3 on the half mirror 1.
(1) Route: O1•A1•E1-11•E1-12•A1•O2•A2•E2-11•E2-12•A2•O3
Optical path difference $3\Delta$
(2) Route: O1•A1•E1-11•E1-12•A1•O2•B2•E2-21•E2-22•B2•O3
Optical path difference $1\Delta$
(3) Route: O1•B1•E1-21•E1-22•B1•O2•A2•E2-11•E2-12•A2•O3
Optical path difference $2\Delta$
(4) Route: O1•B1•E1-21•E1-22•B1•O2•B2•E2-21•E2-22•B2•O3
Optical path difference $0\Delta$ Consequently, the optical pulses passing through the four routes change into the optical pulse train that has a pulse interval of $\Delta/c$ where c is a light velocity.

Therefore, in the route where the optical pulse reaches a preset place O(N+1) on the half mirror 1, subsequent to the above routes, the optical pulse repeats the splitting and combination N times as well as the route described above.

Thus, by placing the mirror units MUi-1 (i=1~N) with arbitrary distances along the normal direction of the half mirror 1, the optical pulse trains P1, P2, P3, . . . , which have the time delay with respect to the incident optical pulse P can be generated. The amount of this time delay is determined by the moving distance of the mirror units MUi-1 (i=1~N), that is, the optical path difference at the mirror units MUi-1 (i=1~N). Consequently, in this embodiment, on the basis of the optical path difference $\Delta$, each mirror unit MUi-1 (i=1~N) is set to have the optical path difference of $2^{i-1}\Delta$ (i=1~N).

According to the optical pulse multiplex unit of the third embodiment, a two to the power of N optical pulse train can be generated.

Moreover, in the optical pulse produced in the optical pulse multiplex unit of the third embodiment, the optical pulses are not spatially separated, but propagate completely along the same axis. Consequently, even though the optical pulse trains multiplexed through the optical pulse multiplex unit of the third embodiment are collected by means of the condenser lens, all optical pulses are collected at the same point from the same direction and thus, when a connection with a optical fiber is attempted, favorable connection efficiency can be realized.

Although the optical path difference is set in the order of $\Delta$, $2\Delta$, . . . , and $2^{N-1}\Delta$ (i=1~N) $\Delta$, it is not limited by this order. It is possible to obtain the same effect with any other orders.
(Modification)

Next, the explanation of the optical pulse multiplex unit is described with regard to the example of the modification of this present invention. In the above embodiment, the half mirror 1 is represented by a line in order to make the understanding easy. On the other hand, the half mirror 1 has a finite thickness as shown in FIG. 10. When a light beam is incident on a finite-thick parallel plate, a refraction effect is occurred at an interface of the air. Hereinafter, for a simplification, the refraction effect is omitted in the figures and the light beam is represented by a line.

Figure 12:
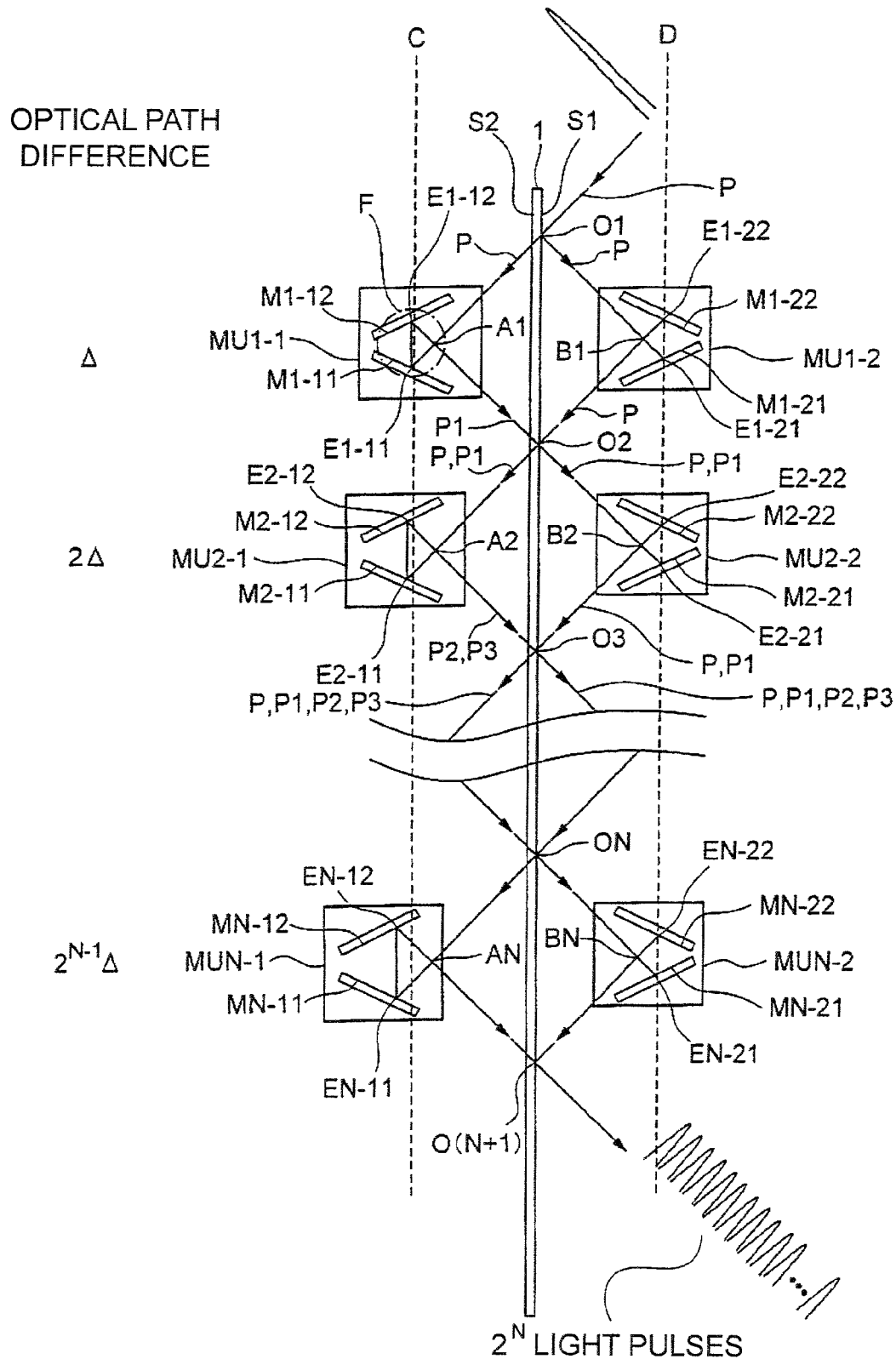
FIG. 12 is a view showing the thickness of the half mirror.

In FIG. 12, the splitting and the combining (the reflection and the transmission) as described above are occurred on one surface S1 among the two surfaces S1 and S2 on the finite-thick half mirror 1. At this time, in FIG. 12, there are asymmetric optical path differences between the optical apparatuses of the right hand side, where there is the mirror unit MUi-2 (i=1~N), and the left hand side, where there is the mirror unit MUi-1 (i=1~N). It is preferable to reduce the asymmetricity of the optical apparatus originated from such the thickness of the half mirror 1.

Figure 13:
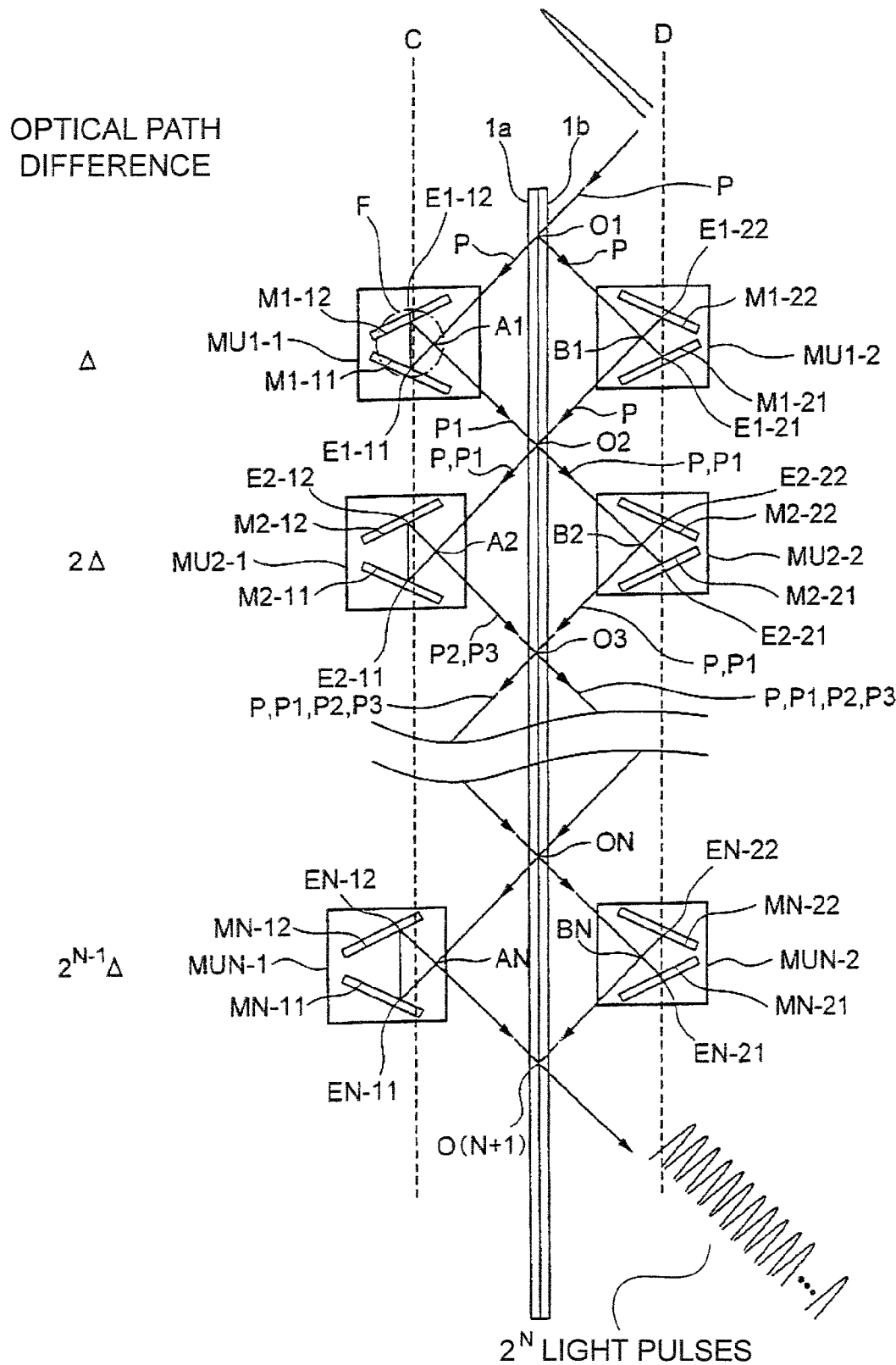
FIG. 13 is a view showing a schematic structure of one modification of the optical pulse multiplex unit.

Therefore, for example, a half mirror 1a joins a compensation plate 1b which has the same thickness and the same refractive index with the half mirror 1a, as shown in FIG. 13. The light beam is split and combined on the joint surface of the half mirror 1a and the compensation plate 1b. This makes it possible to reduce the asymmetricity of the optical apparatus (the optical length).

Figure 14:
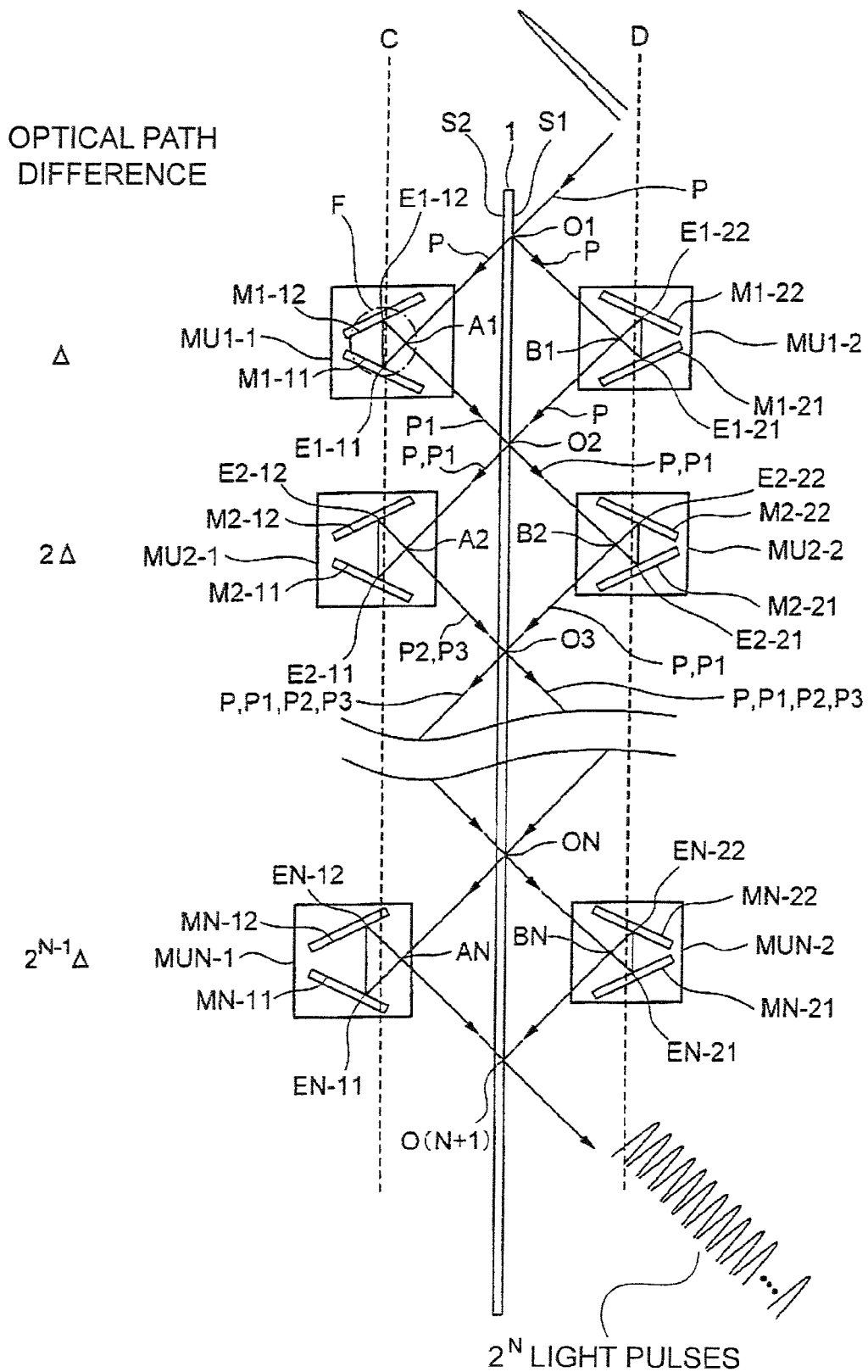
FIG. 14 is a view showing a schematic structure of the other modification of the optical pulse multiplex unit.
Figure 15:
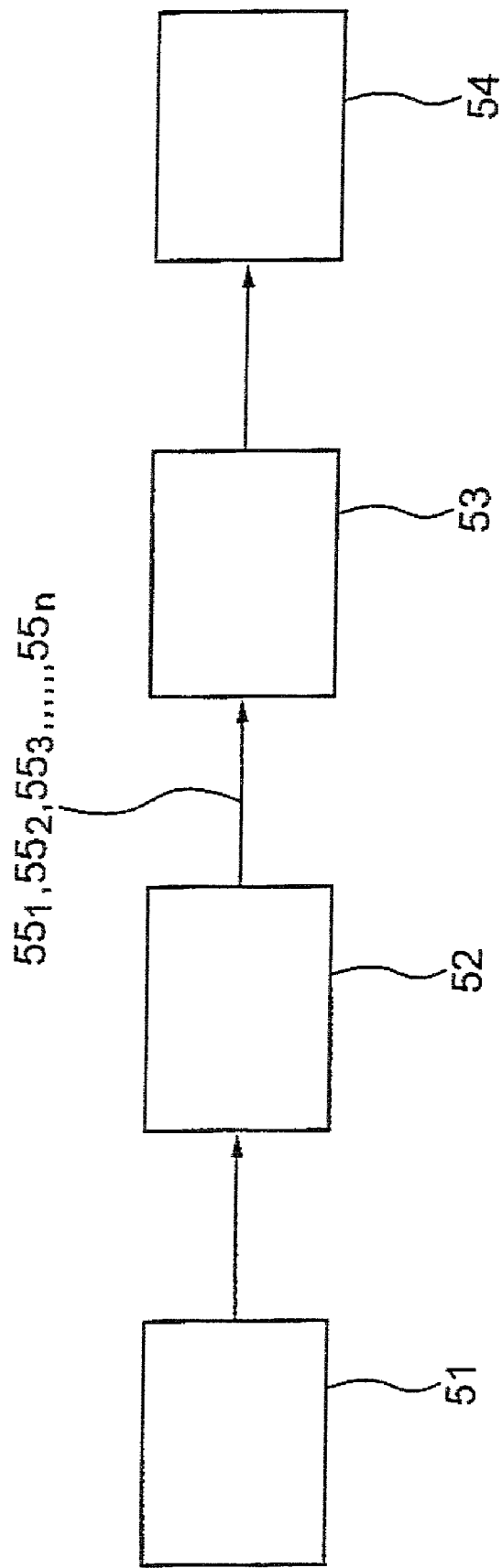
FIG. 15 is a block diagram showing a schematic structure of an example of a conventional optical pulse multiplex unit.
Figure 16:
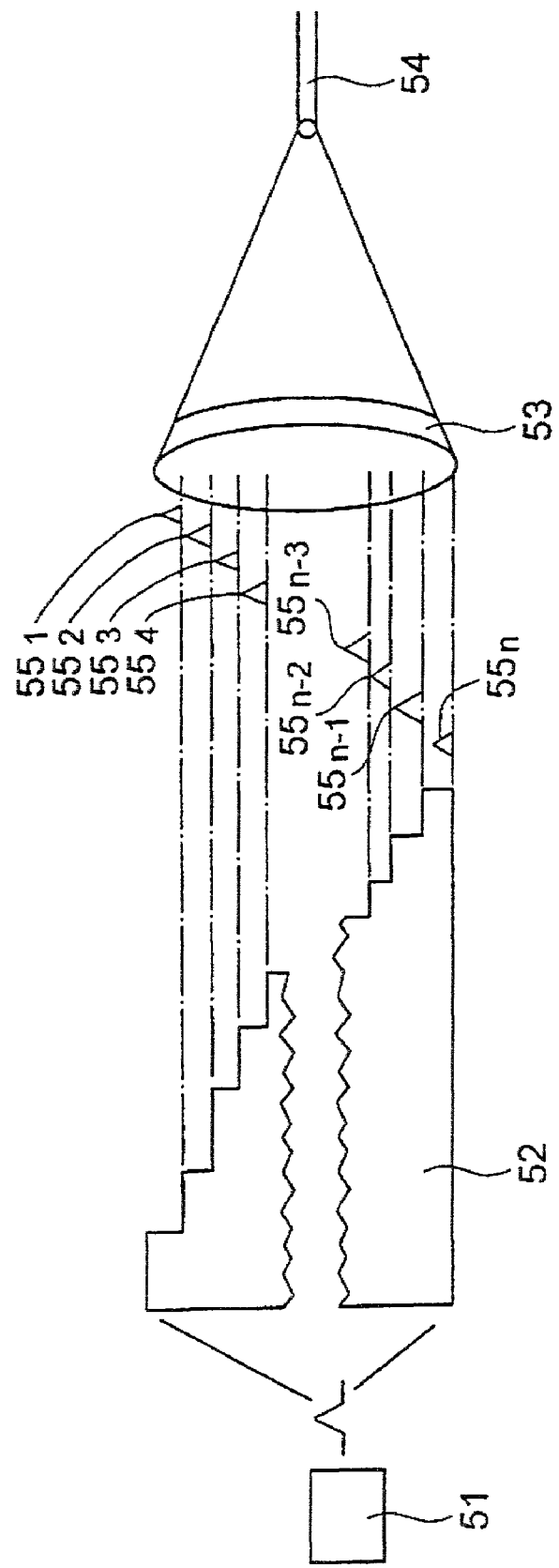
FIG. 16 is a view showing an example of a conventional optical pulse multiplex unit.

As shown in FIG. 14, it is also good to shift the position of the mirror unit MUi-2 (i=1~N) toward the right hand side in the figure, in order to cancel out the asymmetricity of the optical apparatus (optical length) originated from the thickness of the half mirror 1. This makes it possible to reduce the asymmetricity of the optical apparatus (the optical length).

As explained above, according to the present invention, the optical pulse train which has a high coupling efficiency can be obtained. The present invention may be variously modified and changed within the spirit and scope of the invention. For example, in order to change the optical length, the spacing of the mirrors can be changed.

As above, the optical pulse multiplex unit of the present invention is suitable for the case that the pulse interval of the optical pulse train can be set arbitrarily.

The pulse interval of the optical pulse train can be arbitrarily set by using the optical pulse multiplex unit of the present invention. At the same time, the optical pulse train which has a high coupling efficiency can be obtained.

The optical pulse multiplex unit of the present invention is also suitable for the case to obtain the optical pulse train which has a high coupling efficiency.

In addition, according to the optical pulse multiplex unit of the present invention, the optical pulse train that multiple optical pulses propagate along the same axis can be generated. Therefore it is possible to prevent an NA of the exposed optical pulse train from becoming small. As a result, the optical pulse train which has a high coupling efficiency can be obtained.

What is claimed is:
1. An optical pulse multiplex unit comprising:
a half mirror for a splitting incident light to produce a transmitted light and a reflected light;

a pair of mirror units arranged on one side and the other side of the half mirror so that the transmitted light and the reflected light split by the half mirror are deflected and are combined again at a common place on the half mirror; and the mirror unit has a plurality mirrors; and the mirror unit constructed with a moving mechanism which can be moved along one direction so that the optical path length can be variable.

2. An optical pulse multiplex unit according to claim 1, wherein there are the N (N is an integer) mirror units and when the reference optical path difference due to a shift of a first mirror unit toward one direction is denoted by $\Delta$, the substantial optical path difference due to an Nth mirror unit is $(2^{N-1})*\Delta$.

3. An optical pulse multiplex unit according to claim 1 or 2, wherein the mirror unit can be moved parallel toward a normal direction of the half mirror by the moving mechanism.

4. An optical pulse multiplex unit according to claim 3, wherein the mirror unit consists of two mirrors.

5. An optical pulse multiplex unit according to claim 2 or 3, wherein the mirror unit consists of four mirrors.

6. An optical pulse multiplex unit comprising:

an half mirror; and a pair of mirror units arranged on one side and the other side of the half mirror; and a moving mechanism arranged on one side of the half mirror; and the mirror unit has at least two mirrors which are arranged to opposite to each other; and the two mirrors are arranged to decrease the distance between the two mirrors, as they are away from the half mirror; and the two mirrors and the half mirror are arranged to make a virtual plane which is orthogonal to both the two mirrors and the half mirror; and the mirror unit is fixed on the moving mechanism.

7. An optical pulse multiplex unit comprising:

a half mirror for a splitting incident light to generate a transmitted light and a reflected light;

a pair of mirror units arranged on one side and the other side of the half mirror so that the transmitted light and the reflected light split by the half mirror are deflected and are combined again at a common place on the half mirror; and every one of the pair of mirror units has a plurality of mirrors, and the pair of mirror units make either transmitted or reflected light deflect and combine at the same place on the half mirror.

8. An optical pulse multiplex unit according to claim 7, wherein there are the N (N is an integer) mirror units arranged with arbitrary intervals along a normal direction of the half mirror, and when the optical path difference obtained by the mirror unit is denoted by $\Delta$, the substantial optical path difference owing to an Nth mirror unit is $(2^{N-1})\Delta$.

9. An optical pulse multiplex unit according to claim 8, wherein the mirror unit consists of two mirrors.

10. An optical pulse multiplex unit comprising:

an half mirror; and a pair of mirror units arranged on one side and the other side of the half mirror; and a moving mechanism arranged on one side of the half mirror; and the mirror unit has at least two mirrors which are arranged to opposite to each other; and the two mirrors are arranged to decrease the distance between the two mirrors, as they are away from the half mirror; and the two mirrors and the half mirror are arranged to make a virtual plane which is orthogonal to both the two mirrors and the half mirror.

* * * * *